(12) United States Patent
Ekbote

(10) Patent No.: US 9,148,048 B2
(45) Date of Patent: Sep. 29, 2015

(54) DAMPING RESONANCE IN A CONVERTER INCLUDING A COUPLING CAPACITOR

(71) Applicant: Cree,Inc., Durham, NC (US)

(72) Inventor: Ashish Ekbote, Carpinteria, CA (US)

(73) Assignee: Cree, Inc., Durham, NC (US)

( * ) Notice: Subject to any disclaimer, the term of this patent is extended or adjusted under 35 U.S.C. 154(b) by 0 days.

(21) Appl. No.: 13/795,462

(22) Filed: Mar. 12, 2013

(65) Prior Publication Data
US 2014/0265895 A1 Sep. 18, 2014

(51) Int. Cl.
H05B 37/02 (2006.01)
H02M 1/12 (2006.01)
H05B 33/08 (2006.01)
H02M 3/156 (2006.01)
H02M 1/00 (2007.01)

(52) U.S. Cl.
CPC .............. *H02M 1/126* (2013.01); *H02M 3/156* (2013.01); *H05B 33/0815* (2013.01); *H02M 2001/0064* (2013.01)

(58) Field of Classification Search
USPC .......... 363/39, 45; 315/206, 209 R, 219, 223, 315/291
See application file for complete search history.

(56) References Cited

U.S. PATENT DOCUMENTS

| 4,788,634 | A | * | 11/1988 | Schlecht et al. | ........... 363/21.03 |
| 4,937,719 | A | * | 6/1990 | Yamada et al. | ................. 363/39 |
| 5,251,120 | A | * | 10/1993 | Smith | ............................ 363/44 |
| 2013/0049885 | A1 | * | 2/2013 | Rozman et al. | ............... 333/181 |

* cited by examiner

*Primary Examiner* — Thuy Vinh Tran
(74) *Attorney, Agent, or Firm* — Myers, Bigel, Sibley & Sajovec, P.A.

(57) ABSTRACT

A converter circuit includes an input filter including an input capacitor configured to filter electromagnetic interference from an input voltage. The converter circuit includes an output capacitor, a first inductor coupled to the input capacitor, a switch coupled to the first inductor and configured to control a level of current flowing in the first inductor, a coupling capacitor connected to the first inductor, and an output rectifier coupled between the coupling capacitor and the output capacitor. A damping circuit that is configured to damp a resonant frequency of the converter circuit is coupled in parallel with the coupling capacitor.

18 Claims, 4 Drawing Sheets

DAMPING RESONANCE IN A CONVERTER INCLUDING A COUPLING CAPACITOR

TECHNICAL FIELD

The present disclosure relates to power converter circuits, and more particularly to power converter circuits including coupling capacitors, such as single ended primary inductor converter (SEPIC) circuits.

BACKGROUND

Power converters, or power supplies, may be used in electronic applications to convert an input voltage to a desired output voltage to power one or more electronic devices. Some power supplies may be classified as either a linear power supplies or a switched-mode power supply (SMPS).

Switched-mode power supplies may be configured to operate more efficiently than linear power supplies. A switched-mode power supply may include a switch that, when switching on and off, stores energy in an inductor and discharges the stored energy to an output of the switched mode power supply. The switch may be controlled by a controller, which outputs switching signals to turn the switch on and off.

SUMMARY

A converter circuit according to some embodiments includes an input filter including an input capacitor configured to filter electromagnetic interference from an input voltage. The converter circuit includes an output capacitor, a first inductor coupled to the input capacitor, a switch coupled to the first inductor and configured to control a level of current flowing in the first inductor, a coupling capacitor connected to the first inductor, and an output rectifier coupled between the coupling capacitor and the output capacitor. A damping circuit that is configured to damp a resonant frequency of the converter circuit is coupled in parallel with the coupling capacitor.

The converter circuit may include a second inductor coupled to the output capacitor. The second inductor and the first inductor may be wound on a common core.

The damping circuit may include a damping resistor and a damping capacitor in series. The damping resistor can be implemented as a series and/or parallel combination of multiple resistors. A capacitance of the damping capacitor may be based on a capacitance of the input capacitor and the coupling capacitor.

The input filter may include a filter inductor, and a resistance of the damping resistor may be given by $$R_f = R_{0f} \sqrt{\frac{(2+n)\cdot(4+3\cdot n)}{2\cdot n^2 \cdot (4+n)}}$$

where $R_f$ is the resistance of the damping resistor, and $R_{0f}$ is given as $$R_{0f} = \sqrt{\frac{L_f}{C_f}}$$

$L_f$ is the inductance of the filter which may be based on the inductance of a single inductor or multiple inductors. $C_f$ is equal to the sum of the capacitances of the coupling capacitor and the input capacitor, and n is given by $$n := \frac{C_b}{C_f}$$

where $C_b$ is the capacitance of the damping capacitor.

The converter circuit may further include a control circuit configured to control a state of the switch. The converter circuit may be a single ended primary inductor converter circuit.

The converter circuit may further include an output rectifier coupled between the second inductor and the output capacitor.

A resonant frequency of the converter circuit may be based at least in part on a capacitance of the input capacitor and the capacitance of the coupling capacitor. That is, there exists a resonance between the input filter inductance and the sum of the capacitances of the input capacitor and the coupling capacitor.

A single ended primary inductor converter circuit according to some embodiments includes an input filter configured to filter electromagnetic interference from the input voltage, a first inductor coupled to the input filter, an output rectifier, a second inductor coupled to the output rectifier, a coupling capacitor connected between the first inductor and the second inductor, and a damping circuit coupled in parallel with the coupling capacitor and configured to damp a resonant frequency of the input filter inductance and the sum of the capacitances of the input capacitor and the coupling capacitor.

A solid state lighting apparatus according to some embodiments includes a rectification and filtering circuit configured to rectify and filter an input ac voltage signal, a single ended primary inductor converter circuit configured to convert a level of a rectified voltage output by the filter, and a light emitting diode coupled to an output of the single ended primary inductor converter circuit. The single ended primary inductor converter circuit includes a coupling capacitor and a damping circuit coupled in parallel with the coupling capacitor. The damping circuit is configured to damp a resonant frequency associated with the coupling capacitor and the filter.

It is noted that aspects of the inventive concepts described with respect to one embodiment may be incorporated in a different embodiments although not specifically described relative thereto. That is, all embodiments and/or features of any embodiments can be combined in any way and/or combination. These and other objects and/or aspects of the present inventive concepts are explained in detail in the specification set forth below.

BRIEF DESCRIPTION OF THE DRAWINGS

The accompanying drawings are included to provide a further understanding of the disclosure and are incorporated in and constitute a part of this application. In the drawings.

DETAILED DESCRIPTION

Embodiments of the present inventive concepts now will be described more fully hereinafter with reference to the accompanying drawings. The inventive concepts may, however, be embodied in many different forms and should not be construed as limited to the embodiments set forth herein. Rather, these embodiments are provided so that this disclosure will be thorough and complete, and will fully convey the scope of the inventive concepts to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive concepts. As used herein, the term "and/or" includes any and all combinations of one or more of the associated listed items.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 1:
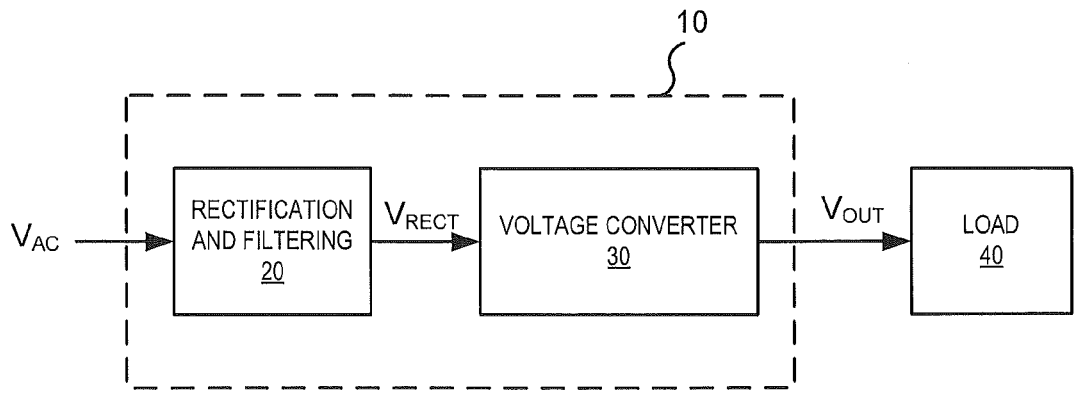
FIG. 1 is a block diagram of a power converter circuit according to some embodiments.

FIG. 1 illustrates a power converter 10 according to some embodiments. The power converter 10 receives an AC input voltage $V_{AC}$ (which may, for example be a 110, 220 or 240 volt AC line voltage) and converts the input voltage to a DC output voltage $V_{OUT}$ that is used to drive a load 40. The power converter 10 includes a rectification and filtering circuit 20 that generates a rectified and filtered voltage $V_{RECT}$ in response to the input voltage, and a voltage converter circuit 30 that generates the DC signal $V_{OUT}$ in response to the rectified and filtered voltage $V_{RECT}$.

Some embodiments provide a converter circuit that regulates a level of current supplied to the load 40. Regulating the load current may be particularly important when driving solid state lighting devices, because the color and/or intensity of light emitted by LEDs may be affected by the level of current flowing through the devices. Variations in drive current may therefore result in undesirable variations in the color and/or intensity of the light output by the apparatus.

In an AC-DC switch mode power supply (SMPS), electromagnetic interference (EMI) noise is generated due to the fast current and voltage transients that occur during high frequency switching. The EMI noise generated by an SMPS can negatively affect other equipment connected on the same utility lines. For this reason, regulatory limits have been placed on the magnitude of EMI noise that is allowed to be generated by an SMPS.

To filter the switching harmonics, EMI filters are typically used on the front end of an SMPS. These EMI filters commonly include an LC network (including either a single stage or multiple stages of inductances and capacitances) which attenuates the magnitude of EMI that can propagate back into the utility line. A side effect of the EMI filter is that there is a resonance between the inductance and capacitance of the EMI filter which can become excited during a transient or disturbance of the input voltage.

In the case of an off-line LED driver that is dimmable by a triac based dimmer, the voltage on the input line voltage may include sharp and/or high transients when the triac turns on. These transients may excite the EMI filter resonance, which may result in oscillations in the input voltage and/or current. The oscillations of input current are of importance. If the amplitude of the input current oscillates below the required level of holding current of the triac, the triac may turn off, thereby interrupting the supply of power to the LED driver. This phenomenon may cause optical flickering of an LED string driven by the LED driver.

In order to provide a stable response to input voltage transients, it is desirable to damp the EMI filter resonance. One way of damping an LC filter resonance in a conventional voltage converter is with an RC network connected across the capacitor of the EMI filter. In most SMPS topologies, the value of the capacitor in the RC damping network depends on the capacitance of the EMI filter capacitor.

Embodiments of the present inventive concepts damp a resonance in converter circuit by placing a damping circuit at a different location in the converter. In particular, some embodiments of the present inventive concepts are explained within the concept of a single ended primary inductor converter (SEPIC) circuit, which includes a coupling capacitor. The resonance of the EMI filter may be damped by placing a damping circuit across the coupling capacitor of the SEPIC circuit. As will be explained in more detail below, this approach may have certain advantages compared to the traditional approach.

Figure 2:
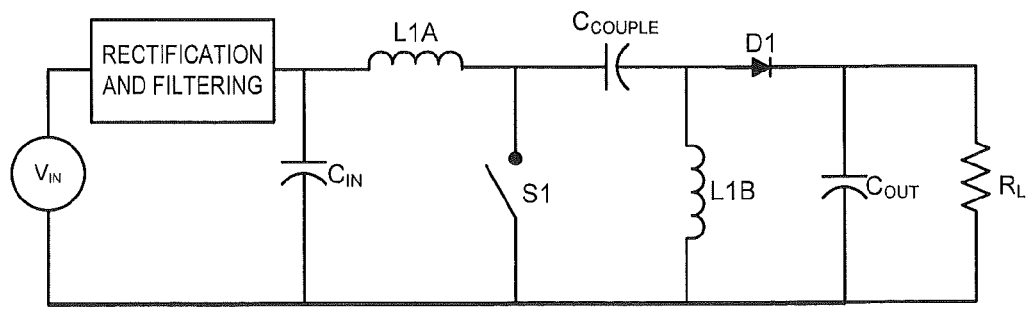
FIG. 2 is a circuit diagram of a generic SEPIC circuit.

A generic model of a SEPIC circuit is illustrated in FIG. 2. In particular, a SEPIC converter circuit includes an input capacitor $C_{IN}$, a coupling capacitor $C_{COUPLE}$, and an output capacitor $C_{OUT}$. A first inductor L1A is coupled between the input capacitor and a first terminal of the coupling capacitor $C_{COUPLE}$. A second inductor L1B is coupled between a second terminal of the coupling capacitor $C_{COUPLE}$ and a common node. A control switch S1 is coupled between the first terminal of the coupling capacitor $C_{COUPLE}$ and the common node. A diode D1 is coupled between the second inductor L1B and the output capacitor $C_{OUT}$. A load resistance $R_L$, is coupled to the output capacitor $C_{OUT}$.

A SEPIC converter circuit provides a non-inverted output using the coupling capacitor $C_{COUPLE}$ to couple energy from the input to the output. The amount of energy exchanged between the input and the output is controlled by the switch S1, which is typically a transistor such as a MOSFET.

During steady-state operation, the average voltage across the coupling capacitor $C_{COUPLE}$ is equal to the input voltage. Because the coupling capacitor $C_{COUPLE}$ blocks DC current, the average current across the coupling capacitor is zero, making inductor L1B the only source of load current. Therefore, the average current through the inductor L1B is the same as the average load current.

The two inductors L1A and L1B can be wound on the same core, such as in a transformer. Since the voltages are the same in magnitude, the effects of mutual inductance will be zero.

As noted above, one feature of a SEPIC converter is that the input voltage can be higher or lower than the output voltage. Unlike a boost converter, the presence of the coupling capacitor in the SEPIC circuit prevents the flow of DC current when the input voltage is higher than the output voltage. Some embodiments of the present inventive concepts damp the LC resonance in a SEPIC converter by placing a damping circuit across the coupling capacitor.

Figure 3:
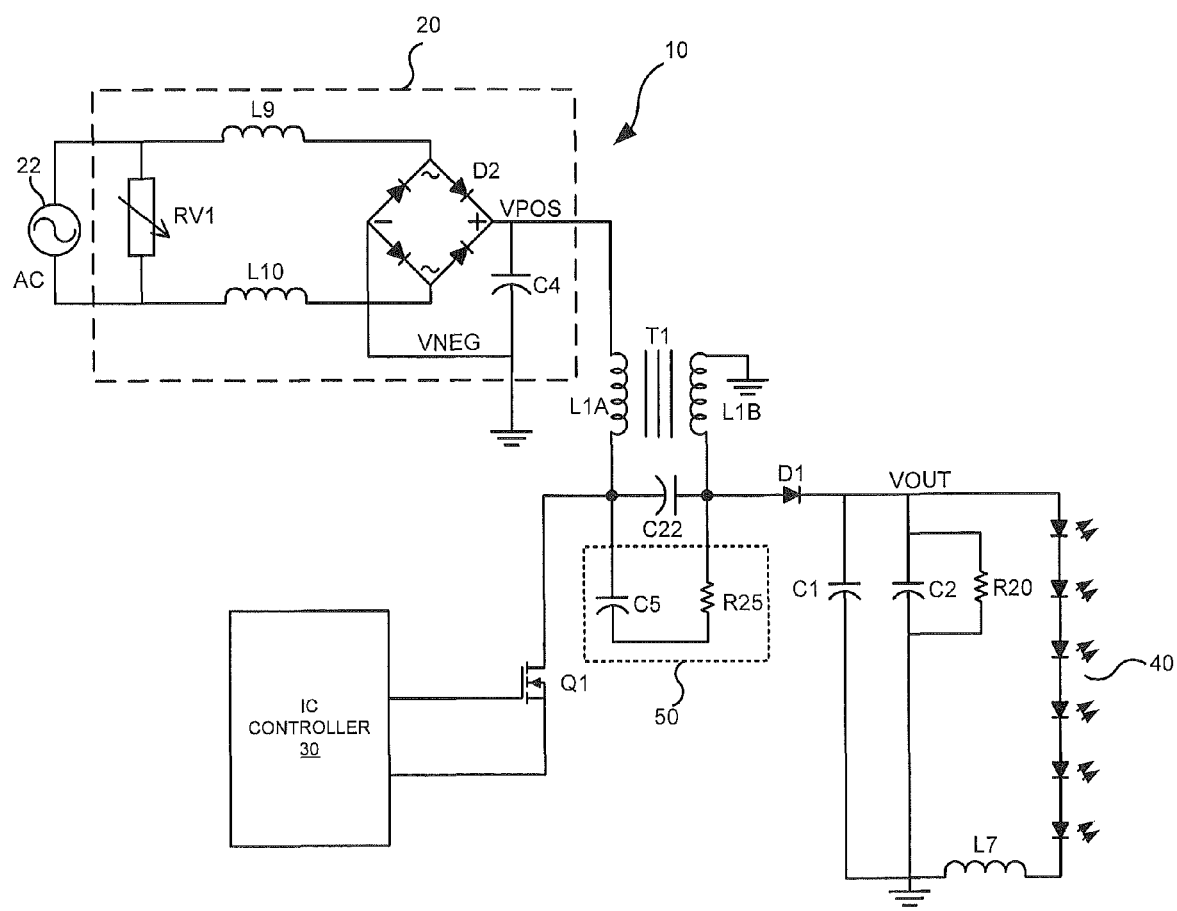
FIGS. 3, 4 and 5 are block diagrams of SEPIC circuits according to some embodiments.

FIG. 3 illustrates a SEPIC converter according to some embodiments. The SEPIC converter includes a rectification and filtering block 20 that receives an input voltage 22. The rectification and filtering block 20 includes a variable resistor RV1, inductors L9 and L10, a full wave rectifying diode bridge circuit D2 and a capacitor C4.

Figure 4:
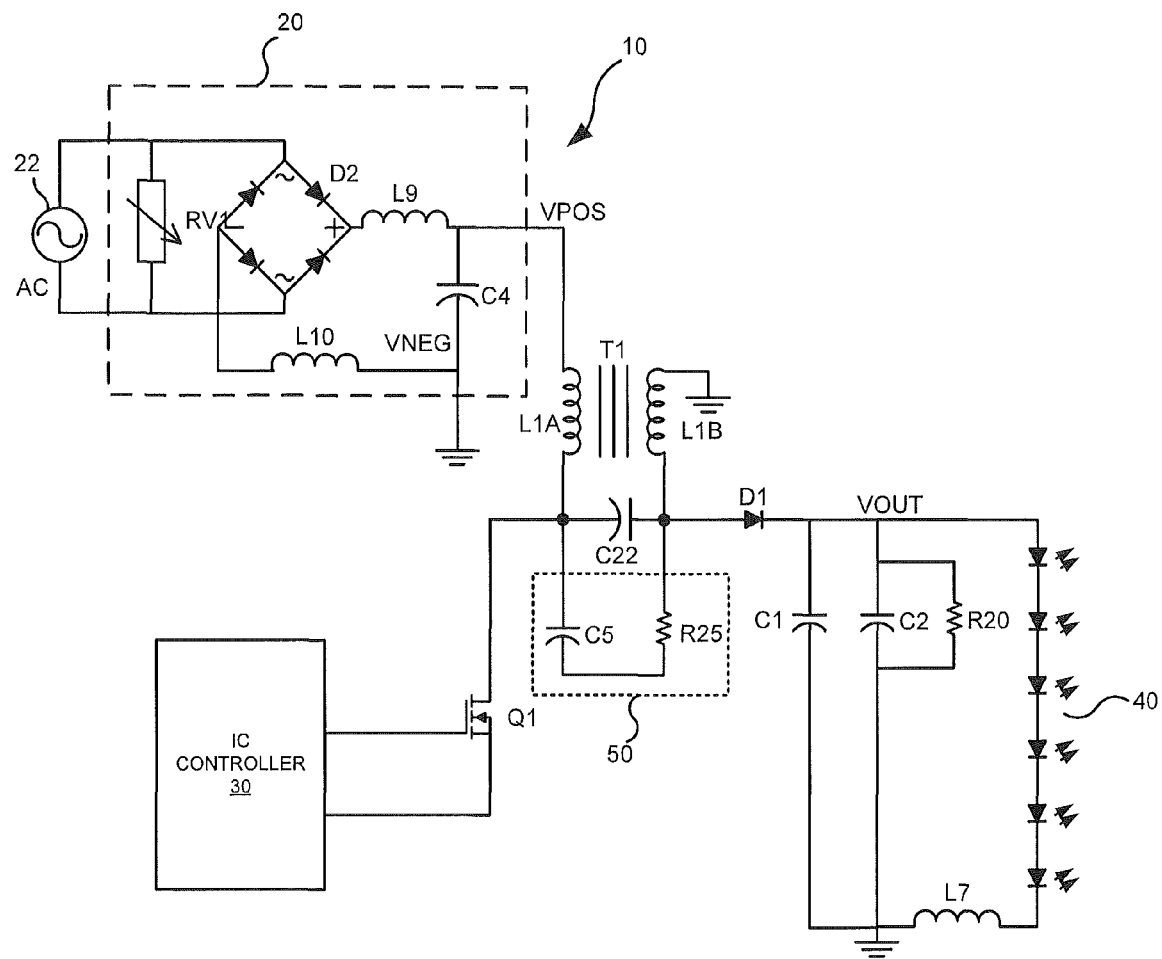
Figure 5:
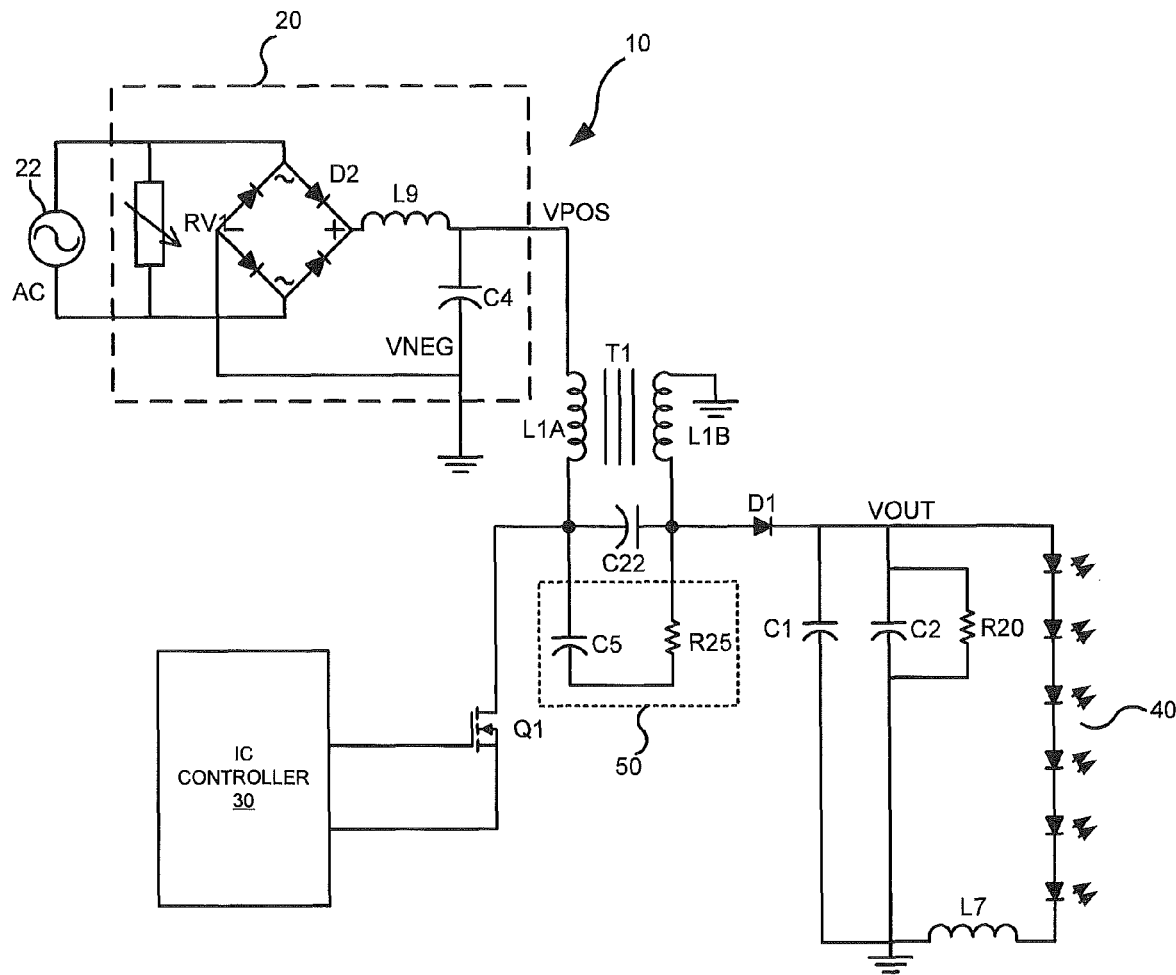

The filter inductors can be arranged in different configurations from the one shown in FIG. 3. For example, although the inductors L9 and L10 are shown as on the left of the bridge rectifier D2, the inductors L9 and L10 can be on the right side of the bridge rectifier D2 as shown in FIG. 4, or inductor L10 can be omitted and inductor L9 can be on the right side of the bridge rectifier D2 as shown in FIG. 5. Other configurations are possible.

Returning to FIG. 3, an output VPOS of the rectification and filtering block 20 is provided to one end of an inductor L1A that is a primary winding of a transformer T1. A coupling capacitor C22 is coupled to an inductor L1B that is the secondary winding of the transformer T1. A control switch Q1 that is controlled by an IC controller 30 is coupled to the inductor L1A, and a diode D1 is coupled to the inductor L1B. An output capacitor C1 is coupled to the diode D1. A load 40, such as an LED string, is coupled to the output capacitor.

In the circuit shown in FIG. 3, an EMI filter is provided by the inductors L9 and L10 and the capacitor C4 (which also serves as the input capacitor).

According to the principle of inductor volt-second balance, the average voltage across an inductor over a switching cycle is zero. This means that the average voltage across the windings of the coupled inductors L1A, L1B over a line cycle is zero. Consequently, it can be seen that the two windings L1A, L1B of the transformer T1 appear as a virtual short circuits. Thus, in the average, the coupling capacitor C22 appears to be connected in parallel with the input/filter capacitor C4. The voltage across the coupling capacitor C22 is same as the input rectified voltage VPOS across the input/filter capacitor C4 plus some ripple voltage at the converter switching frequency.

Thus, in a SEPIC circuit, the damping network design may be modified due to the apparent presence of the coupling capacitor C22 in parallel with the input/filter capacitor C4. The resonance in the SEPIC circuit is between the EMI inductors L9 and L10 and the equivalent capacitor formed by the input/filter capacitor C4 and the coupling capacitor C22. Thus, the selection of the capacitance of a damping capacitor no longer depends just on the capacitance of the input/filter capacitor but on the sum of the capacitance of the input/filter capacitor C4 and the capacitance of the SEPIC coupling capacitor C22.

According to some embodiments, a damping network 50 is provided in parallel with the coupling capacitor C22. The damping network may include an RC network including a damping capacitor C5 and a damping resistor R25 connected in series. The damping network 50 could be configured in different ways than the topology shown in FIG. 3. For example, the order of the damping resistor R25 and the damping capacitor C5 could be reversed. Also, the damping resistor R25 could be implanted as a combination of resistors connected in serial and/or parallel.

A resonant circuit may be characterized by a quality factor, or Q-factor, which is a dimensionless parameter that describes how damped the resonant circuit is. A higher Q-factor indicates a lower rate of energy loss relative to the stored energy of the resonant circuit. That is, in a resonant circuit with a high Q-factor, oscillations will die out more slowly.

Conversely, a heavily damped resonant circuit may have a low Q-factor. A resonant circuit may be characterized as underdamped, overdamped or critically damped. When it is perturbed, an underdamped circuit oscillates at a predetermined frequency with a decay in the amplitude of the oscillation. An overdamped circuit does not oscillate but takes a long time to return to a steady state condition after being perturbed. A critically damped circuit does not oscillate, and has the fastest return to a steady state condition after being perturbed.

The Q-factor for damping of an LC resonance may be defined as $$Q = \sqrt{\frac{(2+n)(4+3n)}{2n^2(4+n)}} \quad (1)$$

where n is the ratio between the damping capacitance $C_b$ and the tank (or resonant) capacitance $C_f$. In the diagram of FIG. 3, the damping capacitance $C_b$ is equal to C5, and the tank capacitance $C_f$ is equal to the sum of the capacitances of the input/filter capacitor C4 and the coupling capacitor C22. Accordingly, $$n = \frac{C_b}{C_f} \quad (2)$$

According to some embodiments, an optimum damping of an LC resonance may be achieved when:

$$Q=1 \quad (3)$$

By substituting Equation (3) into Equation (1), a value of n for optimum damping may be found. The resulting value of value of n may be used to find the value of the damping capacitor that can be used to achieve optimum damping from:

$$C_b = n \times C_f \quad (4)$$

The value of the damping resistor R25 may be calculated by:

$$R_f = R_{0f} \sqrt{\frac{(2+n)\cdot(4+3\cdot n)}{2\cdot n^2 \cdot (4+n)}} \quad (5)$$

where $R_f$ is the value of the damping resistor and $R_{0f}$ is the characteristic impedance of the undamped LC tank. $R_{0f}$ is given as:

$$R_{0f} = \sqrt{\frac{L_f}{C_f}} \quad (6)$$

The value of the damping resistor can be adjusted empirically to compensate for non-idealities and/or losses.

SEPIC converters are rarely used to drive solid state lighting devices. However, the availability of high voltage LEDs have made SEPIC converters more attractive, since they can handle a wide range of input/output voltages with a high level of performance at attractive costs. However, damping the EMI filter in a SEPIC converter is different than other topologies. Traditionally the EMI filter resonance is damped by an RC damping circuit that has a capacitance that is calculated based on the EMI filter capacitance and that is placed across the EMI filter capacitor. However, in a SEPIC converter, the capacitance of the damping capacitor is calculated based on the sum of the capacitance of the EMI filter capacitor and the coupling capacitor. This RC damping network is connected across the coupling capacitor, which provides a more effective damping. Accordingly, some embodiments may facilitate high performance, low cost SEPIC based triac dimmable LED drivers.

Embodiments of the present inventive concepts may be particularly useful in a triac dimmable LED driver including a SEPIC converter. However, it may be beneficial to use RC damping in any closed loop SEPIC design, as it may improve loop stability in the converter in the event of an input transient.

Although the circuits illustrated in the Figures are shown as being implemented with MOSFET transistor switches, it will be appreciated that other types of transistor switches, such bipolar junction transistor (BJT) switches could be used in some embodiments.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments and, although specific terms are employed, they are used in a generic and descriptive sense only and not for purposes of limitation, the scope of the inventive concepts being set forth in the following claims.

What is claimed is:

1. A converter circuit, comprising:
   an input filter including an input capacitor and having an associated filter inductance;
   a second capacitor;
   a damping circuit coupled in parallel with the second capacitor and configured to damp a resonant frequency associated with the second capacitor, the input capacitor and the filter inductance;
   an output capacitor;
   a first inductor coupled to the input capacitor; and
   a switch coupled to the first inductor and configured to control a level of current flowing in the first inductor;
   wherein the second capacitor comprises a coupling capacitor connected to the first inductor.

2. The converter circuit of claim 1, further comprising a second inductor coupled to the Output capacitor, wherein the second inductor and the first inductor are wound on a common core.

3. The converter circuit of claim 2, further comprising an output rectifier coupled between the second inductor and the output capacitor.

4. The converter circuit of claim 1, wherein the damping circuit comprises a damping resistor and a damping capacitor in series.

5. The converter circuit of claim 4, wherein a capacitance of the damping capacitor is based on a capacitance of the input capacitor and the coupling capacitor.

6. The converter circuit of claim 5, wherein the input filter comprises a filter inductor, and wherein a resistance of the damping resistor is given by:

$$R_f = R_{0f} \sqrt{\frac{(2+n) \cdot (4+3 \cdot n)}{2 \cdot n^2 \cdot (4+n)}}$$

where R is the resistance of the damping resistor, and $R_{0f}$ is given as:

$$R_{0f} = \sqrt{\frac{L_f}{C_f}}$$

where $L_f$ is the inductance of the filter inductor and $C_f$ is equal to the sum of the capacitances of the coupling capacitor and the input capacitor; and where n is given by $$n = \frac{C_b}{C_f}$$

where $C_b$ is the capacitance of the damping capacitor.

7. The converter circuit of claim 1, further comprising:
   a control circuit configured to control a state of the switch.

8. The converter circuit of claim 1, wherein the converter circuit further comprises a single ended primary inductor converter circuit.

9. A single ended primary inductor converter circuit, comprising:
   an input filter coupled to an input voltage and configured to filter electromagnetic interference from the input voltage;
   a first inductor coupled to the input filter;
   an output rectifier;
   a second inductor coupled to the output rectifier;
   a coupling capacitor connected between the first inductor and the second inductor; and
   a damping circuit coupled in parallel with the coupling capacitor and configured to damp a resonant frequency of the converter circuit.

10. The single ended primary inductor converter circuit of claim 9, wherein the second inductor and the first inductor are wound on a common core.

11. The single ended primary inductor converter circuit of claim 9, wherein the damping circuit comprises a damping resistor and a damping capacitor in series.

12. The single ended primary inductor converter circuit of claim 11, wherein the input filter comprises a filter capacitor, and wherein a capacitance of the damping capacitor is based on a capacitance of the filter capacitor and the coupling capacitor.

13. The single ended primary inductor converter circuit of claim 12, wherein the input filter comprises a filter inductor, and wherein a resistance of the damping resistor is given by:

$$R_f = R_{0f} \sqrt{\frac{(2+n) \cdot (4+3 \cdot n)}{2 \cdot n^2 \cdot (4+n)}}$$

where $R_f$ is the resistance of the damping resistor, $R_{0f}$ is given as $$R_{0f} = \sqrt{\frac{L_f}{C_f}}$$

where $L_1$ is the inductance of the filter inductor and $C_f$ is equal to the sum of the capacitances of the coupling capacitor and the filter capacitor; and where n is given by $$n = \frac{C_b}{C_f}$$

where Cb is the capacitance of the damping capacitor.

14. A solid state lighting apparatus, comprising:
a rectification and filtering circuit configured to rectify and filter an input ac voltage signal;
a single ended primary inductor converter circuit configured to convert a level of a rectified voltage output by the filter, the single ended primary inductor converter circuit comprising a coupling capacitor and a damping circuit coupled in parallel with the coupling capacitor, wherein the damping circuit is configured to damp a resonant frequency associated with the coupling capacitor and the rectification and filtering circuit; and
a light emitting diode coupled to an output of the single ended primary inductor converter circuit.

15. The solid state lighting apparatus of claim 14, wherein the single ended primary inductor converter circuit comprises:
a first inductor coupled to the filter and to the coupling capacitor;
a second inductor coupled to the coupling capacitor;
an output rectifier coupled to the second inductor;
an output capacitor coupled to the output rectifier;
a switch coupled to the first inductor; and
a control circuit coupled to the switch.

16. The solid state lighting apparatus of claim 15, wherein the damping circuit comprises a damping resistor and a damping capacitor in series.

17. The solid state lighting apparatus of claim 16, wherein the single ended primary inductor converter circuit comprises an input capacitor and wherein a capacitance of the damping capacitor is based on a capacitance of the input capacitor and the coupling capacitor.

18. The solid state lighting apparatus of claim 17, wherein the rectification and filtering circuit comprises a filter inductor, and wherein a resistance of the damping resistor is given by:

$$R_f = R_{0f} \sqrt{\frac{(2+n)\cdot(4+3\cdot n)}{2\cdot n^2 \cdot (4+n)}}$$

where $R_f$ is the resistance of the damping resistor, and $R_{0f}$ is given as:

$$R_{0f} = \sqrt{\frac{L_f}{C_f}}$$

where $L_f$ is the inductance of the filter inductor and $C_f$ is equal to the sum of the capacitances of the coupling, capacitor and the input capacitor; and where n is given by $$n = \frac{C_b}{C_f}$$

where $C_b$ is the capacitance of the damping capacitor.

* * * * *

UNITED STATES PATENT AND TRADEMARK OFFICE
CERTIFICATE OF CORRECTION

PATENT NO. : 9,148,048 B2
APPLICATION NO. : 13/795462
DATED : September 29, 2015
INVENTOR(S) : Ekbote Page 1 of 1

It is certified that error appears in the above-identified patent and that said Letters Patent is hereby corrected as shown below:

In the Specification:
Column 6, Line 12: Please correct "defined as" to read -- defined as: --

In the Claims:
Column 7, Claim 2, Line 56: Please correct "Output" to read -- output --
Column 8, Claim 6, Line 10: Please correct "where R is"
  to read -- where $R_f$ is --
Column 9, Claim 13, Line 9: Please correct "where $L_1$ is the"
  to read -- where $L_f$ is the --
Column 10, Claim 18, Line 20: Please correct "and $R_{ot}$."
  to read -- and $R_{of}$ --

Signed and Sealed this
Fifth Day of April, 2016

Michelle K. Lee
*Director of the United States Patent and Trademark Office*